United States Patent
Julicher et al.

(10) Patent No.: US 9,210,769 B2
(45) Date of Patent: Dec. 8, 2015

(54) CONSTANT BRIGHTNESS LED DRIVE COMMUNICATIONS PORT

(71) Applicant: Microchip Technology Incorporated, Chandler, AZ (US)

(72) Inventors: Joseph Julicher, Maricopa, AZ (US); Jerrold S. Zdenek, Deer Park, IL (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 340 days.

(21) Appl. No.: 13/831,637

(22) Filed: Mar. 15, 2013

(65) Prior Publication Data

US 2014/0265866 A1    Sep. 18, 2014

(51) Int. Cl.
H05B 37/02 (2006.01)
H05B 39/04 (2006.01)
H05B 41/36 (2006.01)
H05B 33/08 (2006.01)

(52) U.S. Cl.
CPC ............ *H05B 37/02* (2013.01); *H05B 33/0818* (2013.01); *H05B 33/0845* (2013.01); *Y02B 20/346* (2013.01)

(58) Field of Classification Search
USPC .................................................. 315/149–151
See application file for complete search history.

(56) References Cited

U.S. PATENT DOCUMENTS

| | | | |
|---|---|---|---|
| 8,624,527 B1* | 1/2014 | Meir et al. ................... | 315/318 |
| 8,994,276 B2* | 3/2015 | Recker et al. ................ | 315/160 |
| 2004/0190838 A1* | 9/2004 | Bush et al. .................... | 385/96 |
| 2004/0190850 A1* | 9/2004 | Chau ............................. | 385/134 |
| 2012/0236121 A1* | 9/2012 | Park et al. ..................... | 348/46 |
| 2012/0249740 A1* | 10/2012 | Lee et al. ...................... | 348/46 |
| 2012/0249797 A1* | 10/2012 | Haddick et al. .............. | 348/158 |
| 2013/0193873 A1* | 8/2013 | Isaacson et al. .............. | 315/294 |
| 2013/0222543 A1* | 8/2013 | Bae et al. ...................... | 348/46 |
| 2013/0229491 A1* | 9/2013 | Kim et al. ..................... | 348/46 |
| 2014/0028197 A1* | 1/2014 | van de Ven ................... | 315/150 |
| 2014/0062319 A1* | 3/2014 | Huang et al. ................. | 315/186 |
| 2014/0070710 A1* | 3/2014 | Harris ........................ | 315/185 R |
| 2014/0166858 A1* | 6/2014 | Lee ............................. | 250/208.1 |

(Continued)

FOREIGN PATENT DOCUMENTS

| | | | | |
|---|---|---|---|---|
| EP | 2547174 A2 | 1/2013 | ........... | H04B 10/116 |
| WO | 02/25842 A2 | 3/2002 | ............. | H04B 10/10 |

OTHER PUBLICATIONS

International Search Report and Written Opinion, Application No. PCT/US2014/019797, 7 pages, Sep. 24, 2014.

*Primary Examiner* — Adam Houston
(74) *Attorney, Agent, or Firm* — Slayden Grubert Beard PLLC

(57) ABSTRACT

A light emitting diode (LED) is driven with a plurality of pulses having controllable pulse widths and positions within clock time periods that provide for both LED light intensity control and digital information communications from a single output node of an integrated circuit (IC) device. The LED light intensity is determined by the duty cycle of the pulses where the human eye integrates these light pulses from the LED into continuous light intensity levels. The digital information contained in the light output from the LED is detected by a photo-detector that converts the light pulses into electric signals that are demodulated and read by a circuit debugger and/or manufacturing test station. The aforementioned operations allow continuous visual display and data transmission using only one output node of the IC device. This is especially advantageous when using low pin count IC devices.

17 Claims, 3 Drawing Sheets

(56) References Cited

U.S. PATENT DOCUMENTS

| | | | |
|---|---|---|---|
| 2014/0217474 A1* | 8/2014 | Lee et al. | 257/225 |
| 2014/0252927 A1* | 9/2014 | Denny et al. | 312/209 |
| 2014/0265866 A1* | 9/2014 | Julicher et al. | 315/149 |
| 2015/0054338 A1* | 2/2015 | Mohammed Suhura et al. | 307/23 |
| 2015/0054863 A1* | 2/2015 | Tanaka et al. | 345/691 |
| 2015/0069914 A1* | 3/2015 | Pop | 315/113 |
| 2015/0097489 A1* | 4/2015 | Wu et al. | 315/122 |

* cited by examiner

# US 9,210,769 B2

CONSTANT BRIGHTNESS LED DRIVE COMMUNICATIONS PORT

TECHNICAL FIELD

The present disclosure relates to low pin count integrated circuit devices, and more particularly, to a single pin having simultaneous dual uses on the integrated circuit package for providing both status communications and visual display.

BACKGROUND

A low pin count integrated circuit application often requires a light emitting diode (LED) for indication and/or status. In addition, all low pin count integrated circuit devices preferably have some type of communications channel during development and final production.

SUMMARY

Therefore, there is a need for a way to provide both visual indication and communications, e.g., program operation, data and/or status, for a low pin count integrated circuit application.

According to an embodiment, a method for driving a light emitting diode (LED) and transmitting digital information using a single node of an integrated circuit device may comprise the steps of: generating a plurality of pulses from a single node of an integrated circuit device; and coupling the plurality of pulses from the single node of the integrated circuit device to a light emitting diode (LED); wherein the plurality of pulses from the single node of the integrated circuit device control light intensity from the LED and transmit digital information.

According to a further embodiment of the method, the light intensity from the LED may be substantially proportional to pulse widths of the plurality of pulses. According to a further embodiment of the method, each of the plurality of pulses may occur within two sequential clock times. According to a further embodiment of the method, a level change for each of the plurality of pulses may occur within two sequential clock times. According to a further embodiment of the method, a high to low level change may represent a logic 1 and a low to high level change may represent a logic 0. According to a further embodiment of the method, a low to high level change may represent a logic 1 and a high to low level change may represent a logic 0. According to a further embodiment of the method, the level change representing a logic 1 may occur at a different position within the two sequential clock times then the level change representing a logic 0.

According to a further embodiment of the method, may additionally comprise the steps of: converting light pulses from the LED to electrical pulses with a photo-detector; coupling the electrical pulses from the photo-detector to a data reception device; and converting the electrical pulses from the photo-detector back into the digital information.

According to another embodiment, an integrated circuit device may comprise: a digital processor and memory; a serial interface having an input coupled to the digital processor; a light emitting diode (LED) light intensity control circuit having an input coupled to the digital processor; a modulator having a first input coupled to an output of the serial interface and a second input coupled to an output of the LED light intensity control circuit; and a single node coupled to an output of the modulator.

According to a further embodiment, a LED may be coupled to the single node. According to a further embodiment, a current limiting resistor may be coupled between the LED and the single node.

According to yet another embodiment, a system for driving a light emitting diode (LED) and transmitting digital information using a single node of an integrated circuit device may comprise: an integrated circuit device generating a plurality of pulses from a single node thereof; and a light emitting diode (LED) coupled to the single node of the integrated circuit device; wherein the plurality of pulses from the single node of the integrated circuit device control light intensity from the LED and transmit digital information.

According to a further embodiment, the light intensity from the LED may be substantially proportional to pulse widths of the plurality of pulses. According to a further embodiment, each of the plurality of pulses occurs within two sequential clock times. According to a further embodiment, a level change for each of the plurality of pulses may occur within two sequential clock times. According to a further embodiment, a high to low level change may represent a logic 1 and a low to high level change may represent a logic 0. According to a further embodiment, a low to high level change may represent a logic 1 and a high to low level change may represent a logic 0. According to a further embodiment, the level change representing a logic 1 may occur at a different position within the two sequential clock times then the level change representing a logic 0.

According to a further embodiment, a photo-detector may be used for converting light pulses from the LED to electrical pulses; and a data reception device may be coupled to the photo-detector and adapted for receiving the electrical pulses; wherein the electrical pulses from the photo-detector may be converted back into the digital information by the data reception device.

BRIEF DESCRIPTION OF THE DRAWINGS

A more complete understanding of the present disclosure may be acquired by referring to the following description taken in conjunction with the accompanying drawings wherein.

Figure 1:
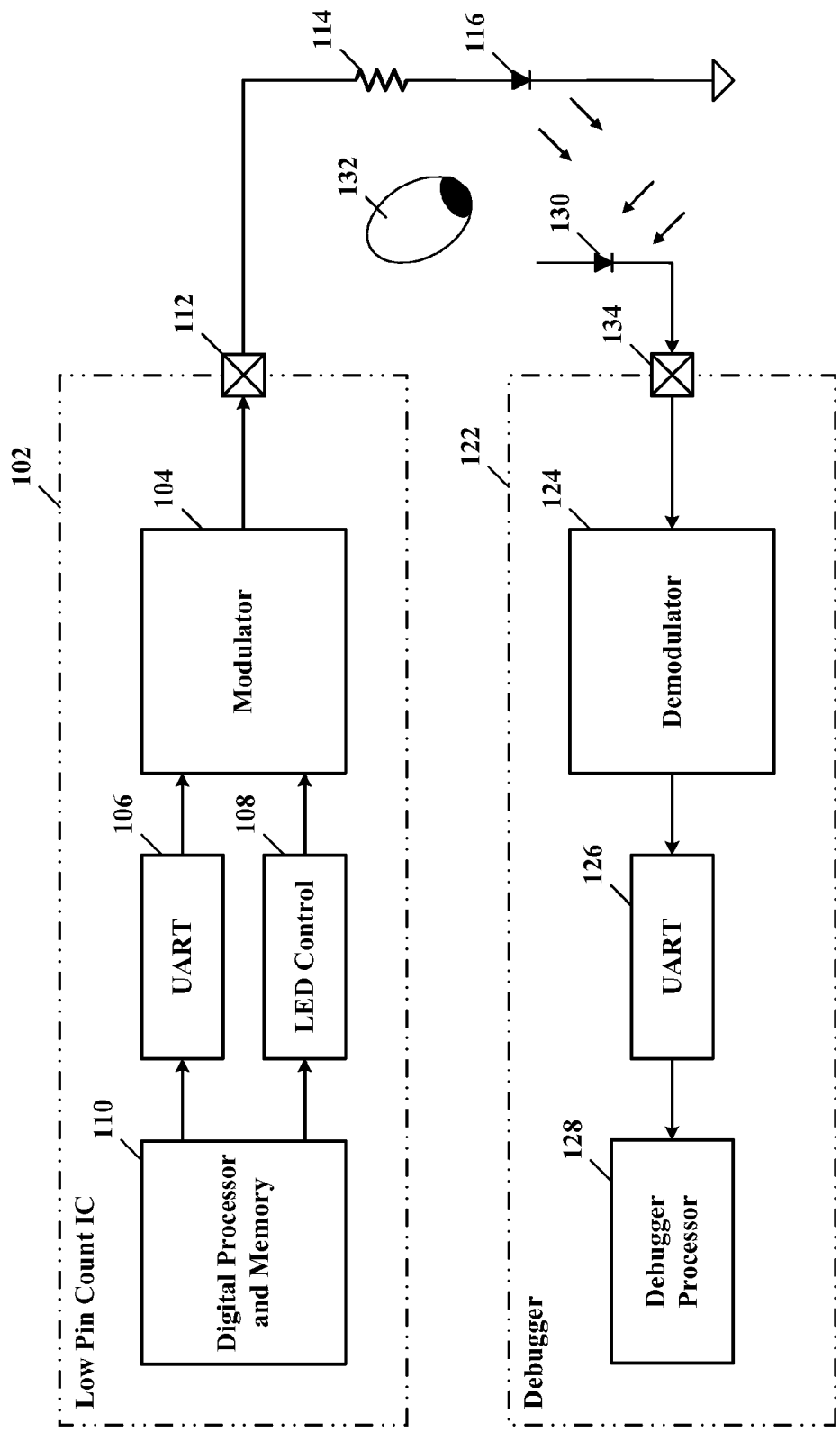
FIG. 1 illustrates a schematic block diagram of a low pin count integrated circuit device, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

A light emitting diode (LED) is driven with a plurality of pulses having controllable pulse widths and positions within clock time periods that provide for both LED light intensity control and digital information communications from a single output node of an integrated circuit (IC) device, e.g., low pin count IC device. Serial information (e.g., data), e.g., from a UART, and light intensity control of the LED are combined together in a light intensity and digital information modulator. The LED light intensity is controlled by the pulse output from the light intensity and digital information modulator. The human eye integrates light pulses from the LED into continuous light intensity levels depending upon the pulse widths thereof.

The digital information contained in the light output from the LED is detected by a photo-detector that converts the light pulses from the LED into electric signals that may be coupled to a demodulator that may be associated with a circuit debugger and/or manufacturing test station. The demodulated data output from the demodulator may be read by a digital processor associated with the circuit debugger and/or manufacturing test station. The aforementioned operations allow continuous visual display and data transmission using only one output node (e.g., pin, ball bump, etc.) of the IC device. This is especially advantageous when using low pin count IC devices, e.g., encapsulated in low pin count IC device packages.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a low pin count integrated circuit device, according to a specific example embodiment of this disclosure. A low pin count integrated circuit (IC) device 102 may comprise a digital processor and memory 110, a serial interface 106, e.g., UART, a LED light intensity control circuit 108 and a modulator 104 for combining the outputs from the serial interface 106 and the LED light intensity control circuit 108 in a serial stream of a plurality of pulses that may be applied to a LED 116 in series with a current limiting resistor 114. The output from the modulator 104 is coupled to the LED 116/resistor 114 through a single node 112 associated with the IC device 102.

Light pulses from the LED 116 may be received by a photo-detector 130 that converts these light pulses into electronic pulses that may be coupled to a demodulator 124 associated with a data reception device 122, e.g., circuit debugger, manufacturing test station, etc. Light from the LED 116 may also be seen by a human eye 132 that integrates the light pulses therefrom into light intensity levels proportional to the pulse widths of these light pulses. The data reception device 122 may comprise the demodulator 124, a serial interface 126, e.g., UART, and a debugging or test processor 128. The photo-detector 130 may be coupled to the demodulator 124 through node 134 of the data reception device 122.

It is contemplated and within the scope of this disclosure that the node 112 of the IC device 102 may be coupled directly to node 134 of the data reception device 122, wherein the photo-detector 130 is no longer required for data reception by the data reception device 122.

Figure 2:
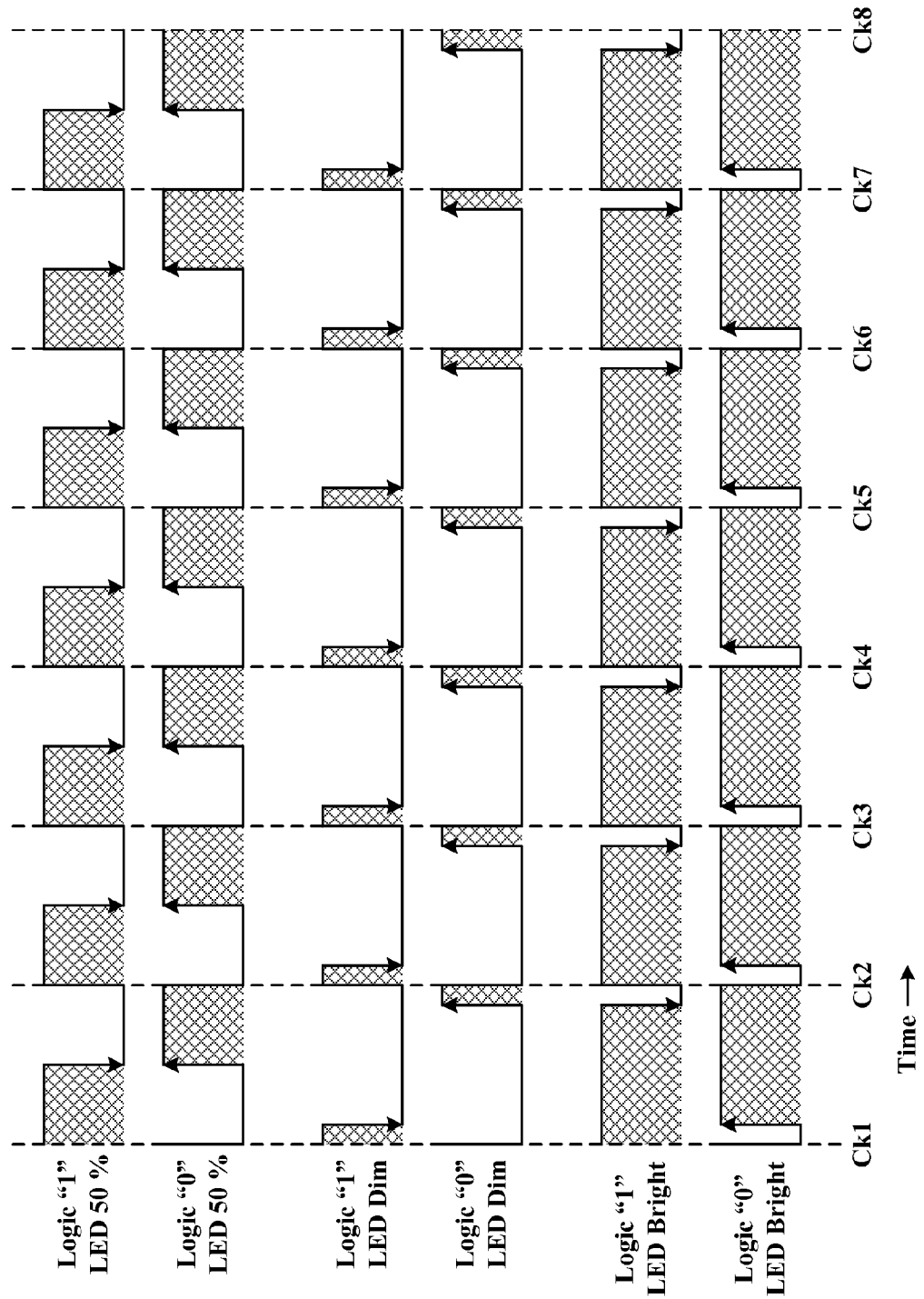
FIG. 2 illustrates schematic waveform timing diagrams to produce various LED light intensity outputs, according to the teachings of this disclosure.

Referring to FIG. 2, depicted are schematic waveform timing diagrams to produce various LED light intensity outputs, according to the teachings of this disclosure. The light intensity that appears to a human eye 132 will be substantially proportional to the integration of the pulse widths of the plurality of light pulses from the LED 116. The LED 116 will have a light output when current is flowing through the LED 116 and the integration of these plurality of light pulses is indicated by the cross-hatched areas shown in FIG. 2. For example, pulse widths at a 50 percent duty cycle will produce light from the LED 116 at about half maximum brightness. Very high duty cycle pulse widths will produce light from the LED 116 at about a maximum brightness. And very low duty cycle pulse widths will produce light from the LED 116 at about a minimum brightness. The minimum pulse widths may be adjusted to point where the human eye 132 does not substantially perceive a light output from the LED 116, wherein the LED 116 will appear to be off to the human eye 132. Even at very low duty cycle (very small pulse widths) the data embedded in the plurality of light pulses, represented by arrows in the waveform timing diagrams of FIG. 2, will be recoverable.

Figure 3:
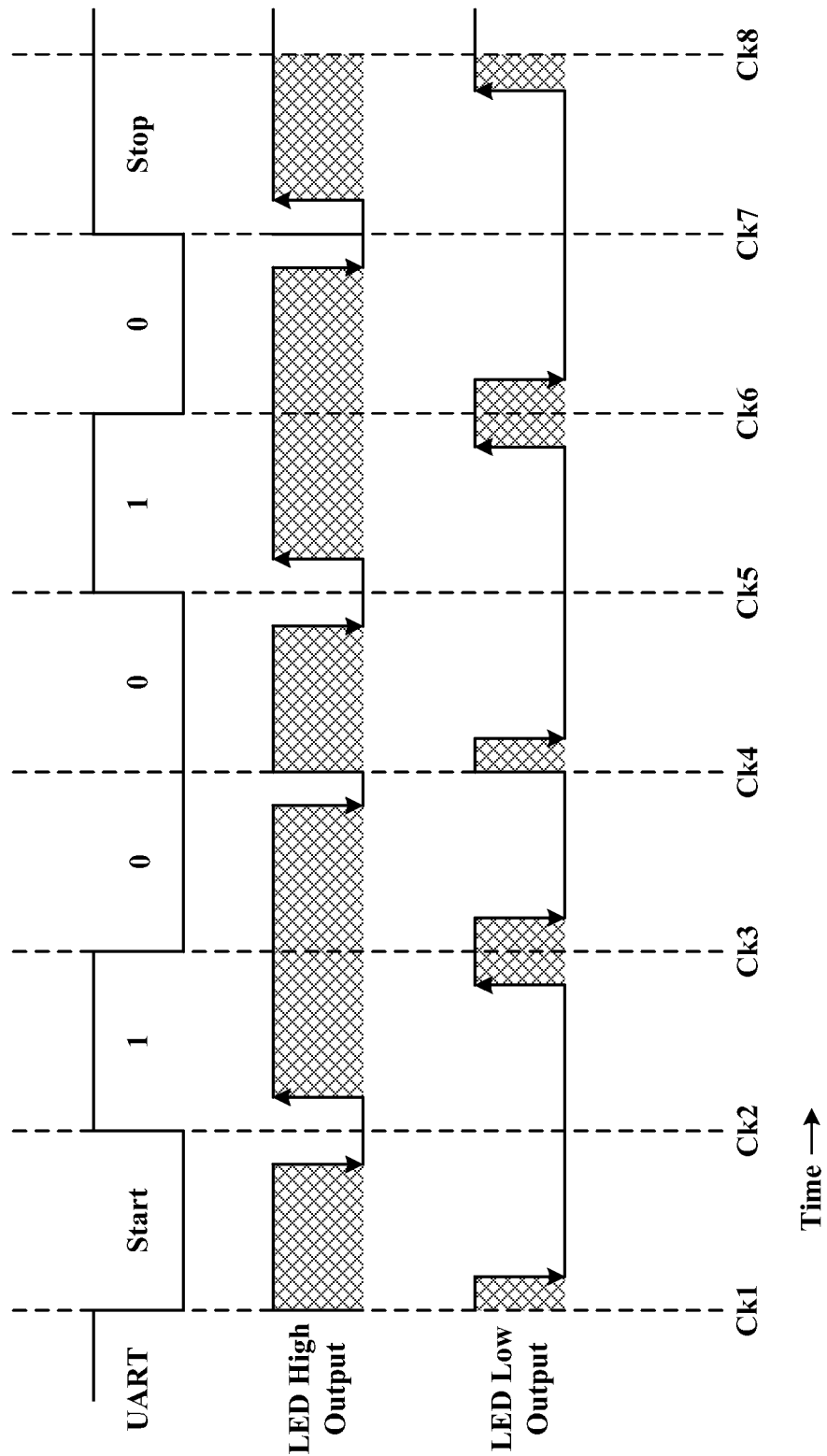
FIG. 3 illustrates schematic waveform timing diagrams for high and low LED light intensity outputs when modulated with digital signals from a UART as shown in FIG. 1, according to a specific example embodiment of this disclosure.

Referring to FIG. 3, depicted are schematic waveform timing diagrams for high and low LED light intensity outputs when modulated with digital signals from a UART as shown in FIG. 1, according to a specific example embodiment of this disclosure. High and low levels, e.g., high and low voltages or high and low currents, representing data may be generated serially by the serial interface 106. A start pulse(s) may indicate the start of a serial data transmission. The start portion of the serial data transmission may be a plurality of low levels (logic zeros) (only one low level shown). The serial interface 126 may initiate receive data acquisition by locking onto the serial transmission clock rate that may be derived from the start portion of serial data transmission comprising the plurality of low levels (logic zeros).

Once the serial transmission clock rate has been determined and locked onto, each serial data symbol may be decoded to be either a logic "1" (e.g., high level) or a logic "0" (e.g., low level). As shown in FIG. 3, a logic "1" symbol may be represented by a high level to a low level transition represented by a downward pointing arrow, and a logic "0" symbol may be represented by a low level to a high level transition represented by a upward pointing arrow. These level transitions may be determined between sequential clock times, represented by Ck1, Ck2, . . . , e.g., a level transition occurring between clock times may be decoded into either a logic "1" or a logic "0". For example, symbol decoding between clock times Ck2:Ck3 shows a level transition from a low level to a high level, indicating a data symbol representing a data "1", and between clock times Ck3:Ck4 and Ck:Ck5 shows level transitions from high levels to low levels, indicating data symbols representing two data bits, each having a logic "0" data value. Level transitions at the clock boundaries may be ignored as data symbols by the serial interface 126 but may be used to maintain clock timing synchronization. It is contemplated and within the scope of this disclosure that a data symbol representing "1" may also be a level transition from high to low, and a data symbol representing "0" may also be a level transition from low to high.

The light output from the LED 116 may be controlled by the pulse widths of the logic high pulses thereto. The longer the pulse widths (time durations) of high pulses, the brighter the light output from the LED 116. For a high light output from the LED 116, logic highs would be applied to the LED 116 for substantial portions of the waveform between the clock times. Conversely, for a very low light output (substantially no visual perception of light by a human eye 132) from the LED 116, logic highs would be applied to the LED 116 for substantially insignificant portions of the waveform between the clock times. Light output levels in-between substantially full light output and substantially no light output would be approximately proportional to the pulse widths at the high logic level, e.g., Vdd (power source voltage). The widths of the pulses only affect the light intensity output from the LED 116 since data symbol detection occurs at logic level transitions between clock timing boundaries. The data coding may be, for example but is not limited to, Manchester coding.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for driving a light emitting diode (LED) and optically transmitting digital information using a single node of an integrated circuit device, said method comprising the steps of:
   generating a plurality of pulses from a single node of an integrated circuit device, wherein the pukes are arranged within consecutive constant periods, each period having an ON time defined by a pulse and an OFF time; and
   coupling the plurality of pulses from the single node of the integrated circuit device to a light emitting diode (LED);
   wherein the plurality of pulses from the single node of the integrated circuit device control light intensity from the LED and optically transmit digital information, wherein the light intensity from the LED is substantially proportional to pulse widths of the plurality of pulses and wherein a bit is encoded within each period by either a falling or rising edge.

2. The method according to claim 1, wherein for receiving a transmitted digital information, a level transition at a period boundary is ignored.

3. The method according to claim 1, wherein a start bit is encoded by a hit sequence of consecutive logic "0".

4. The method according to claim 2, wherein a start bit is encoded by a bit sequence of consecutive logic "0".

5. The method according to claim 1, wherein a rising edge represents a logic 1 and a falling edge represents a logic 0.

6. The method according to claim 5, wherein falling edge represents a logic 1 and a rising edge represents a logic 0.

7. The method according to claim 4, wherein the a rising or falling edge occurs at a different position within a period depending on a selected light intensity.

8. The method according to claim 1, further comprising the steps of:
   converting light pulses from the LED to electrical pulses with a photo-detector;
   coupling the electrical pulses from the photo-detector to a data reception device; and
   converting the electrical pulses from the photo-detector back into the digital information.

9. An integrated circuit device, comprising:
   a digital processor and memory;
   a serial interface having an input coupled to the digital processor;
   a light emitting diode (LED) light intensity control circuit having an input coupled to the digital processor, wherein the LED intensity control circuit is configured to generate a pulse width modulated signal having a constant period, wherein each period. having an ON time and an OFF time;
   a modulator having a first input coupled to an output of the serial interface and a second input coupled to an output of the LED light intensity control circuit, wherein during each period the modulator depending on a bit value outputs either said ON time followed by said OFF time or said OFF time followed by said ON time; and
   a single node coupled to an output of the modulator, wherein the single node is configured to be coupled with an LED operable to transmit data received from the serial interface.

10. A system comprising the integrated circuit device according to claim 9, further comprising the LED coupled to the single node.

11. The system according to claim 10, further comprising a current limiting resistor coupled between the LED and the single node.

12. An integrated circuit device, comprising:
   a digital processor and memory;
   a serial interface having an output coupled to the digital processor;
   a demodulator having an output coupled to an input of the serial interface and an input coupled to an external connection which is configured to be coupled with a photo detector, wherein the demodulator is configured to demodulate a received signal by detecting consecutive periods of the received signal and by determining a bit value within each period depending on a rising or falling edge within said period, wherein a level transition at a period boundary is ignored.

13. The integrated circuit device according to 12, wherein a start bit is encoded by a bit sequence of consecutive logic "0".

14. The integrated circuit or method according to claim 12, wherein a minimum light intensity comprise pulses with an ON time that are invisible to the human eye.

15. The integrated circuit according to claim 12, wherein a rising edge represents a logic 1 and a falling edge represents a logic 0.

16. The integrated circuit according to claim 12, wherein a falling edge represents a logic 1 and a rising edge represents a logic 0.

17. A system comprising:
   a transmitter comprising a first integrated circuit (102) which comprises:
      a digital processor and memory;
      a serial interface having an input coupled to the digital processor;
      a light emitting diode (LED) light intensity control circuit having an input coupled to the digital processor, wherein the LED light intensity control circuit is configured to generate a pulse width modulated signal having a constant period, wherein each period having an ON time and an OFF time;
      a modulator having a first input coupled to an output of the serial interface and a second input coupled to an output of the LED light intensity control circuit, wherein during each period the modulator depending on a bit value outputs either said ON time followed by said OFF time or said OFF time followed by said ON time; and
      a single node coupled to an output of the modulator;
   an LED coupled with the single output;
   a photo detector;
   a receiver coupled with the photo detector, comprising an integrated circuit (122) which comprises:
      a digital processor and memory;
      a serial interface having an output coupled to the digital processor; and
      a modulator having an output coupled to an input of the serial interface and an input coupled to an external connection which is configured to be coupled with the photo detector, wherein the modulator is configured to demodulate a received signal by detecting consecutive periods of the received signal and by determining a bit value within each period depending on a rising or falling edge within said period, wherein a level transition at a period boundary is ignored.

* * * * *

UNITED STATES PATENT AND TRADEMARK OFFICE
CERTIFICATE OF CORRECTION

| | | |
|---|---|---|
| PATENT NO. | : 9,210,769 B2 | Page 1 of 1 |
| APPLICATION NO. | : 13/831637 | |
| DATED | : December 8, 2015 | |
| INVENTOR(S) | : Julicher et al. | |

It is certified that error appears in the above-identified patent and that said Letters Patent is hereby corrected as shown below:

In the claims

Column 5,
Claim 3, line 36, "…encoded by a hit sequence of consecutive logic '0' …" ---Change to---
"…encoded by a bit sequence of consecutive logic '0' …"

Signed and Sealed this
Twenty-ninth Day of March, 2016

Michelle K. Lee
*Director of the United States Patent and Trademark Office*